Patented May 12, 1925.

1,537,441

UNITED STATES PATENT OFFICE.

HANS HAHL AND WALTER KROPP, OF ELBERFELD, GERMANY, ASSIGNORS TO FARBENFABRIKEN VORM. FRIEDR. BAYER AND CO., OF LEVERKUSEN, NEAR COLOGNE-ON-THE-RHINE, GERMANY.

PHARMACEUTICAL COMPOUND CONSISTING OF THE MAGNESIUM-VANADIUM SALT OF TRIGLYCOLLAMIC ACID.

No Drawing.     Application filed January 24, 1925. Serial No. 4,494.

*To all whom it may concern:*

Be it known that we, (1) HANS HAHL and (2) WALTER KROPP, citizens of Germany, residing at (1) and (2) Elberfeld, in the State of Prussia, Germany, have invented new and useful Improvements in Pharmaceutical Compounds Consisting of the Magnesium-Vanadium Salt of Triglycollamic Acid, of which the following is a specification.

The present invention concerns the production of the hitherto unknown complex alkali-earth vanadium salts of triglycollamic acid. The term alkali earth metal is used as generic to magnesium calcium, barium and strontium.

The new compounds are generally brownish solid products soluble in water. They have proved to be valuable remedies against syphilis.

In order to illustrate the new invention the following example is given:—

20 parts by weight of triglycollamic acid of the formula: $N(CH_2-COOH)_3$ are heated during some hours together with 4.2 parts by weight of magnesium oxide, 200 parts by weight of water and 10 parts by weight of vanadium oxide $V_2O_3$. The liquid is then filtered and the filtrate is evaporated to dryness. The complex magnesium vanadium salt of the triglycollamic acid is thus obtained in the shape of a brownish amorphous compound, soluble in water with a yellow coloration which soon turns green. The solutions can be kept without decomposition. They are colored blue by the addition of a mineral acid. This complex magnesium vanadium salt has probably the formula:

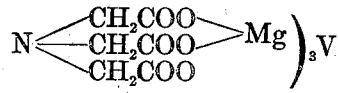

The complex strontium vanadium salt is also a brownish amorphous compound soluble in water.

We claim:

1. The process for producing complex salts of vanadium and an alkali earth metal with triglycollamic acid, which process consists in treating the triglycollamic acid with vanadium trioxide and an alkali earth metal compound, substantially as described.

2. The herein described new complex salts of trivalent vanadium and an alkali earth metal with triglycollamic acid, which products are generally brownish products soluble in water and are valuable remedies against syphilis, substantially as described.

3. The herein described new complex magnesium vanadium salt of triglycollamic acid, being a brownish amorphous compound soluble in water with a yellow coloration soon turning green, which solution is colored blue by the addition of a mineral acid, and being a valuable remedy against syphilis, substantially as described.

In testimony whereof we have hereunto set our hands.

HANS HAHL.
WALTER KROPP.